W. JOURDAN.
TWINE HOLDER AND FASTENER.
APPLICATION FILED OCT. 6, 1911.
1,071,159.
Patented Aug. 26, 1913.
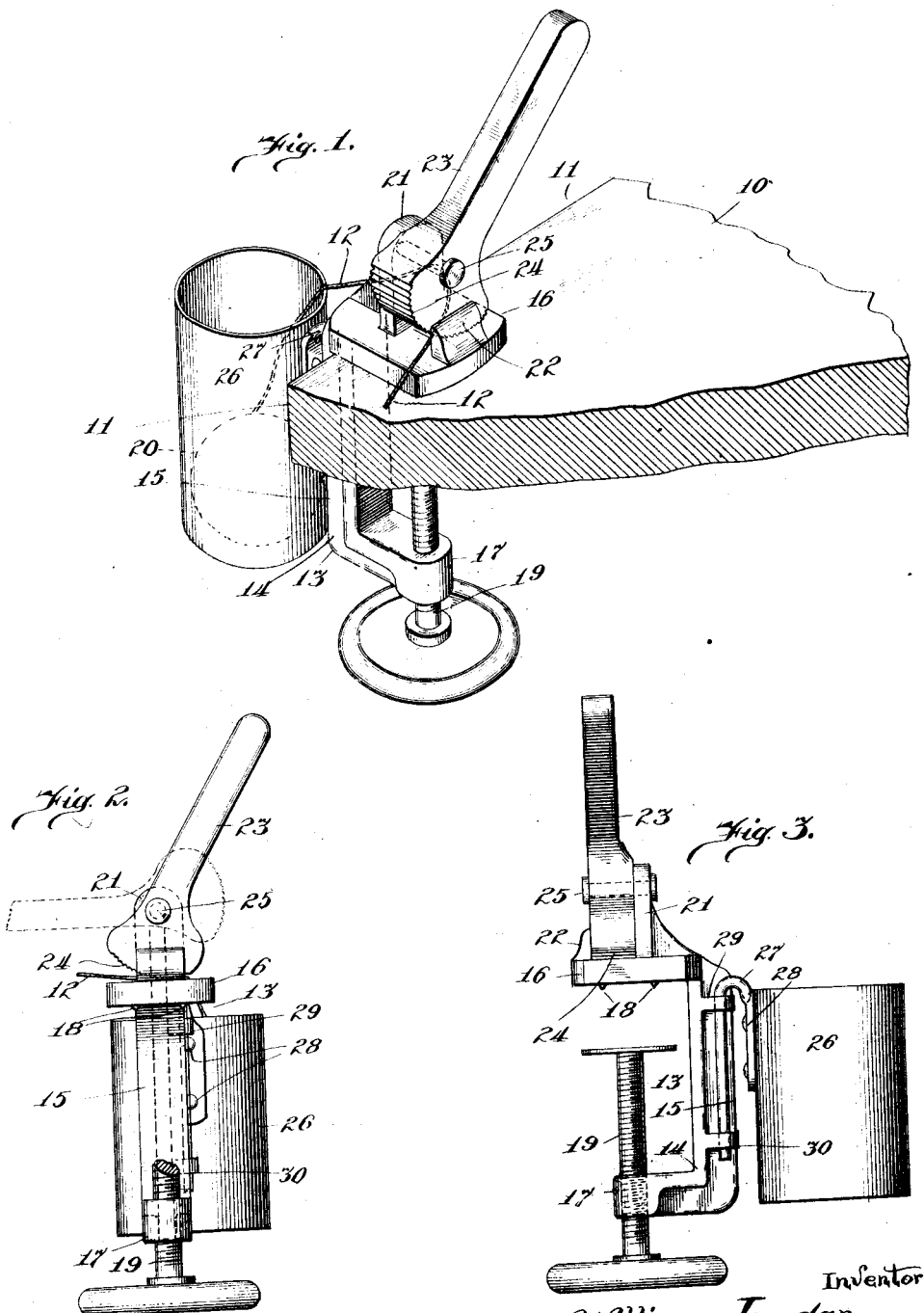

UNITED STATES PATENT OFFICE.

WILLIAM JOURDAN, OF CHICAGO, ILLINOIS.

TWINE HOLDER AND FASTENER.

1,071,159.

Specification of Letters Patent.

Patented Aug. 26, 1913.

Application filed October 6, 1911. Serial No. 653,230.

*To all whom it may concern:*

Be it known that I, WILLIAM JOURDAN, a citizen of the United States, and resident of Chicago, county of Cook, and State of Illinois, have invented certain new and useful Improvements in Twine Holders and Fasteners, of which the following is a specification, and which are illustrated in the accompanying drawings, forming a part thereof.

The invention relates to twine holders and has for its object to provide a holder adapted to serve twine from a ball in lengths and to firmly hold the twine against an outward pull during the use of the length and until the same has been severed.

In the use of twine for certain purposes, as in the tying of sausages, it is desirable to have one end of the twine firmly held against an outward pull. To this end it has heretofore been the practice to cut the twine into a number of lengths, each length being enough longer than that desired for use to permit of one end of the length being securely fastened as by being tied upon a nail driven in the workman's bench. This practice has been attended with unnecessary labor and great wastefulness in the use of the twine, and as short ends of the twine have necessarily accumulated upon the support to which the lengths are attached, these have collected dirt and have, therefore, presented an unsightly appearance and an unsanitary condition. The present invention contemplates a holder adapted to be detachably secured to the bench and to serve twine in lengths from a ball and to firmly hold the same during the use of each length for tying sausages or other articles.

In the accompanying drawings—Figure 1 is a perspective view illustrating a detail of a work bench and showing a twine holder, of the form provided by the invention, mounted thereon. Fig. 2 is a side elevation of the twine holder illustrated in Fig. 1, showing the parts in a different position in dotted lines, and, Fig. 3 is a rear elevation of the same.

A detail of a work bench or table such as that upon which sausages are tied is shown at 10 in Fig. 1 of the drawings. For the tying of sausages upon such a table, it is desirable to have twine supplied in lengths, as 12, which are firmly held at one end and which extend parallel to and adjacent the left-hand end, as 11, of the bench. In carrying out the invention, a clamp generally designated 13 is preferably provided. This clamp conveniently comprises a frame or holder 14 of substantially U-shape and including an upright member 15 and horizontal instanding arms 16, 17. The upper instanding arm 16 is preferably applied directly to the upper surface of the table 10 adjacent the end 11 thereof and, as shown, is equipped with spurs 18 upon its lower face. A clamping screw 19 of usual construction extends through and has threaded engagement with the lower instanding arm 17.

The lengths of twine, as 12, are most desirably supplied from a ball, as 20, and are extended over the upper arm 16 of the holder 14, preferably between guide lugs 21 and 22 which rise from the upper surface of the said arm and are suitably spaced apart to receive the twine between them. Releasable means is provided for gripping the twine in order that one end of each length, as 12, may be firmly held while still permitting a new length to be drawn from the ball 20 after each preceding length has been used. As shown, a clutch arm 23 having a roughened or corrugated cam surface 24 adapted to coöperate with the upper surface of the arm 16 in holding the twine against an outward pull, is pivotally mounted upon one of the guide lugs, as 21, and plays between the two lugs. Preferably the guide lug 21 is of considerable height and carries a headed bolt 25 adjacent its upper end, such bolt being extended horizontally over the space between the guide lugs 21 and 22 and serving as the pivot upon which the clutch arm 23 is mounted. The guide lug 22 is relatively short whereby space is provided for introducing the twine laterally over this guide lug and into the space below the clutch arm 23 when the clutch arm is thrown forward, as shown by dotted lines in Fig. 2.

A receptacle for receiving the ball, as 20, of twine is preferably mounted on the holder 14. As shown, this receptacle takes the form of a cylinder or basket 26 having an open top. It is attached to the holder 14, preferably through the use of an overhanging bracket arm 27. One end of this bracket arm is permanently secured, as by rivets 28, to the side wall of the receptacle 26. The other end of the bracket arm 27 is hooked into apertured lugs, as 29 and 30 formed upon the upright portion 15 of the holder 14.

In using the device provided by the invention, the holder 14 is applied to the bench or table 10 adjacent the end 11, the spurs 18 being drawn into the upper surface of the table by the use of the clamping screw 19, in order that the device shall be firmly held in position. An end portion of the twine having been laid into the space between the guide lugs 21, 22 beneath the clutch arm 23 in the manner heretofore described, the quantity or length of twine desired for use is drawn out upon the bench in front of the holder. The higher end of the clutch arm 23 is then thrown backward whereby the twine is firmly gripped between the upper surface of the arm 16 of the holder 14 and the lower end of the clutch arm. When the quantity or length of twine previously drawn out has been used, the higher end of the clutch arm 23 will be drawn forward to release the twine and permit a new length to be drawn from the ball 20. Each length of twine is thus firmly held at one end while being used and successive lengths of twine may be drawn from the ball and used without waste. When it is desired to use the bench 10 for another purpose, the device provided by the invention may be removed therefrom by simply releasing the clamping screw 19.

I claim as my invention—

In a twine holder, in combination, a base plate, guide lugs of unequal height rising from the base plate and spaced apart thereon to receive the twine between them, a clutch arm playing between the said guide lugs and coöperating with the said base plate to releasably grip the twine, the said clutch arm being pivotally mounted upon the higher one of the two guide lugs and having a cam shaped end, the height of the lower guide lug being such that when the clutch arm is turned to that position in which the twine is released, its lower end is higher than the upper end of the said lower guide lug whereby the twine may be laterally introduced over said lower guide lug into the space between the guide lugs and beneath the said clutch arm.

WILLIAM JOURDAN.

Witnesses:
CHARLES B. GILSON,
E. M. KLATCHER.